J. W. ROMINE.
TRACTOR.
APPLICATION FILED JULY 30, 1915.
1,183,123.
Patented May 16, 1916.
2 SHEETS—SHEET 1.
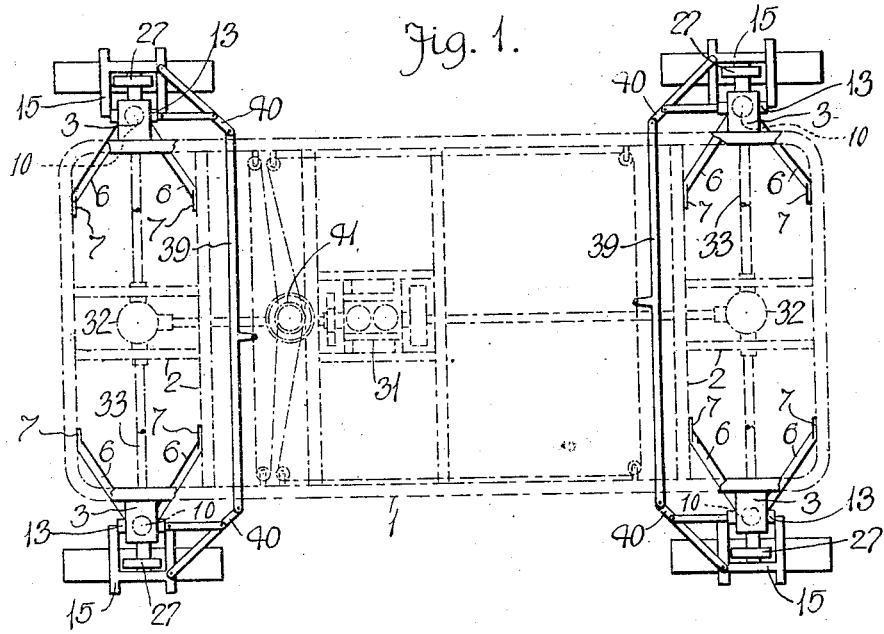
Fig. 1.
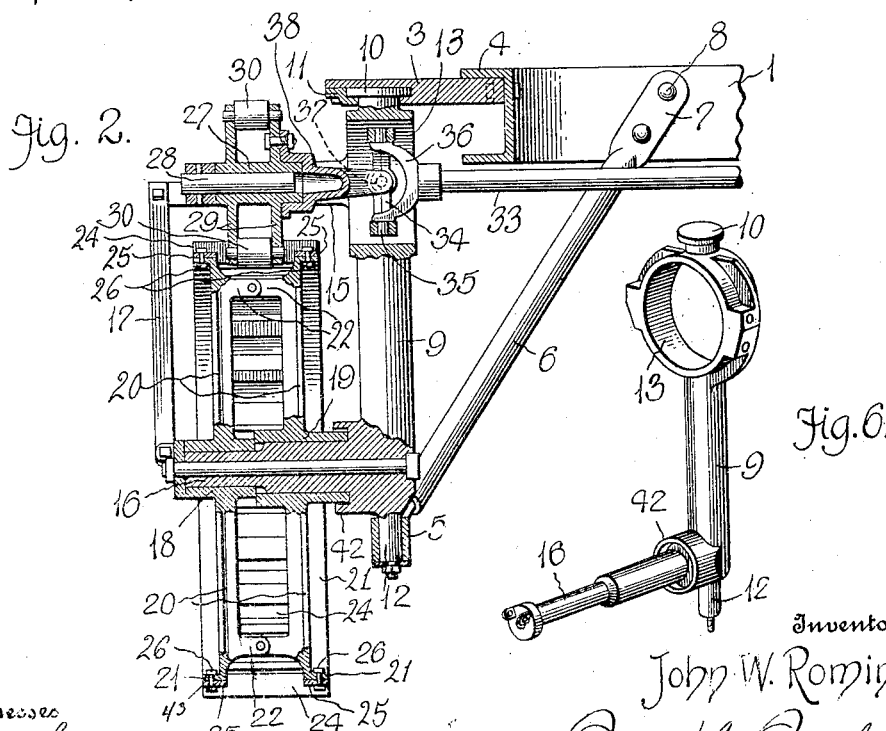
Fig. 2.
Fig. 6.
Witnesses
Chas. W. Stauffiger
Anna M. Dorr
Inventor
John W. Romine,
By Barthel & Barthel
Attorneys

UNITED STATES PATENT OFFICE.

JOHN W. ROMINE, OF MONROE, MICHIGAN, ASSIGNOR OF ONE-TENTH TO THE GREENING NURSERY CO., OF MONROE, MICHIGAN.

TRACTOR.

1,183,123.  Specification of Letters Patent.  Patented May 16, 1916.

Application filed July 30, 1915.  Serial No. 42,839.

*To all whom it may concern:*

Be it known that I, JOHN W. ROMINE, a citizen of the United States of America, residing at Monroe, in the county of Monroe and State of Michigan, have invented certain new and useful Improvements in Tractors, of which the following is a specification, reference being had therein to the accompanying drawings.

In the operation of tractors for cultivating tree, and shrubbery or plant plots or fields of nurseries and tall crops, it is necessary that the frame of the tractor be held at such height as to clear the tops of the trees, shrubbery or crops frequently at an elevation of five or six feet above the level of the ground. This is attained conveniently by making the tractor wheels which bear or carry the frame, of large diameter and doing away with the axles, and in such instance the torque of the driving mechanism which is given to the wheels is most efficacious if applied at or near the peripheries thereof. It is also a matter of good construction that the wheels be outside of the frame so that the latter give the best possible clearance. On account of the size of the wheels, it is also necessary that the supporting bearings be rigidly braced to avoid displacement under heavy use, while at the same time the angular movement of the wheel be not impaired.

This invention relates to a tractor adapted for use in cultivating fields or plots of a nursery or shrubbery, or the tall crops of a farm, in which the frame is supported by wheels of large diameter of sufficient height to give necessary clearance by means which afford wide angular movement to the tractor wheels while the power is applied thereto at a point that is efficient, with the result that the bearings for the wheels do not need to be as strongly and rigidly supported where the torque is transferred to the wheel hub.

The invention consists in the matters hereinafter set forth and more particularly pointed out in the appended claims.

Figure 3:
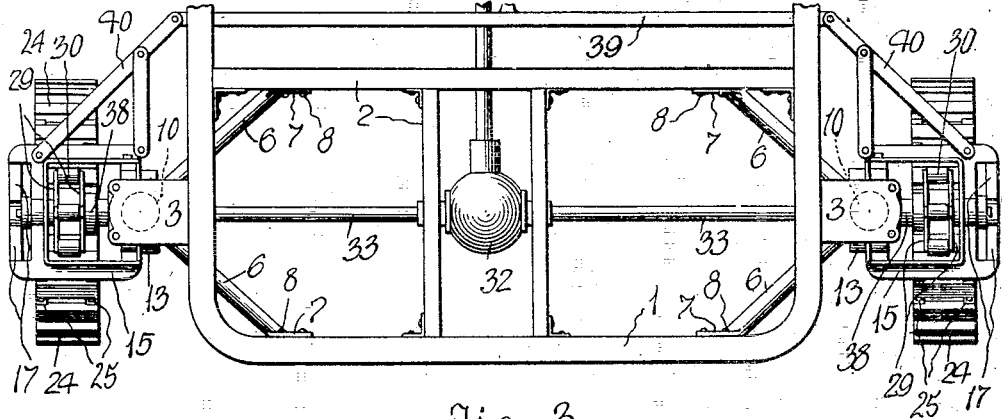
Figure 4:
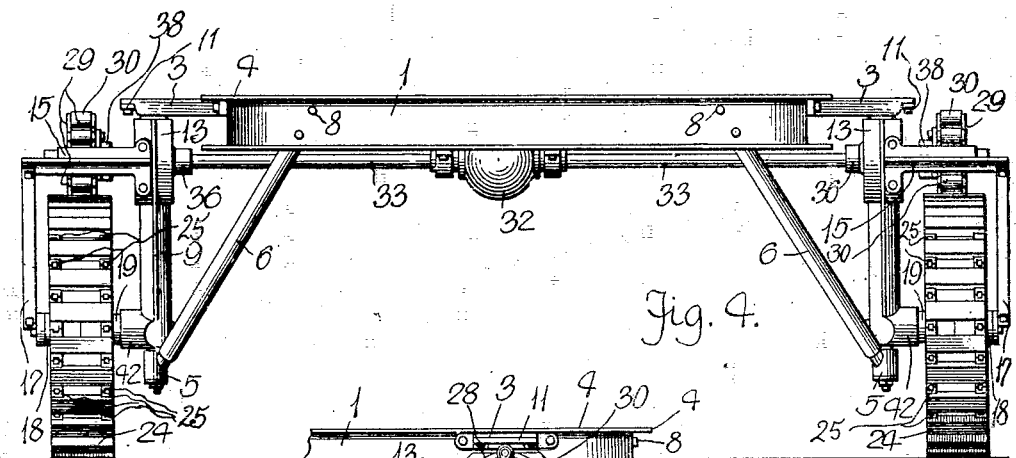
Figure 5:
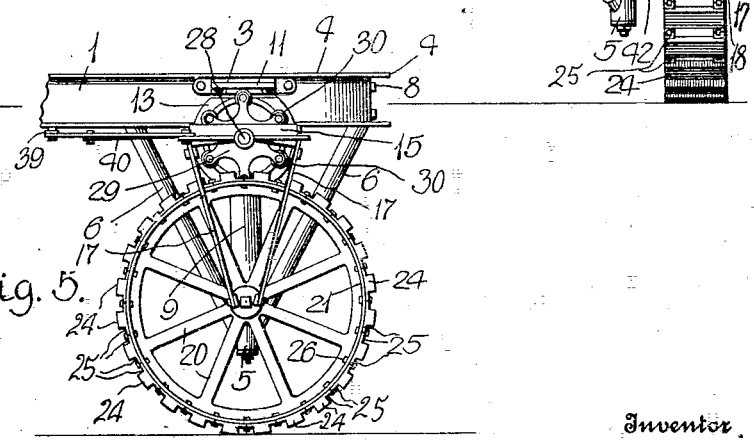

In the drawings, Figure 1 is a view partially diagrammatic so far as the frame is concerned, of a tractor embodying features of the invention; Fig. 2 is an enlarged view in detail in vertical section through a traction bearing wheel and the bearings and supporting members thereof; Fig. 3 is a view in detail enlarged, and in plan, of one end portion of a frame with the supporting tractor, power applying means and steering control; Fig. 4 is a view in end elevation of the parts indicated at Fig. 3; Fig. 5 is a view in elevation of a traction bearing wheel and its supporting parts, and Fig. 6 is a view in detail of a bearing wheel spindle.

Referring to the drawings, a main frame 1 is formed of suitable channel bars or other mill form members held in suitable spaced relation by intermediate members 2 in such a way as to combine rigidity with lightness. Near each end of the frame a pair of oppositely disposed bearing brackets 3 extend from the lateral frame members to which they are secured preferably against the underfaces of the upper flanges 4 thereof. A lower bearing member 5 is secured in vertical alinement with each bracket 3 as by suitably disposed brace members 6 which are herein shown as tubular with flat end portions 7 riveted as at 8 or otherwise fixed to the frame.

A bearing wheel spindle 9 is journaled in upright position in the brackets 3 and 5. As herein shown such spindle is forged or cast of suitable design to combine strength and lightness with an upper flanged bearing head 10 rotatable in the corresponding recess of the bracket 3 in which it is retained by a segmental member 11 that is removably secured in position. A lower journal 12 is rotatable in the bearing member 5. An opening is formed transversely through the upper part of the spindle which is preferably enlarged into a yoke or annulus 13 against the side of which the ring 14 of an outer bearing frame or yoke 15 is secured, in parallel relation to a wheel hub bearing stud 16 that is formed integrally on or secured to the lower portion of the spindle 9. Convergent braces 17 secure the outer portion of the yoke and the stud 16 in fixed relation.

A traction bearing wheel is mounted on the stud 16. Preferably such a wheel is built up of suitable hub members 18 and 19, either integral or separate, each journaled on a suitably designed part of the stud, a dust collar 42 being provided if desired. Suitable spokes 20 or the like support outer rim members 21 in concentric relation to the hub and spaced relation to each other, the spoke members being if preferred, formed of such sheet metal construction as is desired to combine proper resistance to weight and torque with lightness. As herein shown the lateral relation of the rim members is maintained by spacing lugs 22 or the like that are suitably riveted or bolted together. Tread members or spud blocks 24 are secured in spaced relation regularly around the rim members 21. As herein shown the latter have tread flanges 25 that afford convenient means for attaching bolts 26 which pass through half openings in the abutting faces of spacing lugs 43 extending from the end portions of the spud blocks 24 and conforming to the convex faces of the rim flanges 25, so that each bolt secures a pair of lugs in position. The spud blocks may be hollowed or otherwise designed to lighten the construction without affecting its rigidity. They are also disposed so as to form cogs.

Power is applied to the periphery of each traction bearing wheel by means of a barrel pinion 27 which is journaled on a stud 28 extending inwardly on the member or yoke 15 in substantially axial alinement with the ring 13 of the spindle 9. As herein shown spiders or flanges 29 afford bearings for pinion rollers or barrels 30 that are proportioned and spaced to mesh properly with the spud blocks 24 of the traction bearing wheels.

A suitable motor indicated at 31 is operatively connected as through differential mechanism shown at 32 or other like means to driving shafts 33 each of which is coupled through a universal joint connection with a barrel pinion 27. As herein shown a gimbal ring 34 engages spindles 35 of a yoke 36 on the shaft 33 and corresponding spindles 37 disposed at right angles axially to the spindles 35 and mounted on the arm of a wheel yoke 38 that is appropriately secured to the pinion 27.

A link 39 couples oppositely disposed steering arms 40 of each traction wheel which are appropriately connected to the members 15 thereof. As herein shown these links are interconnected to a steering mechanism 41 by any preferred steering mechanism. As neither the motor, the direct driving connections between the motor and the shaft 33, nor the interconnections of the traction bearing wheels to swing in unison, form a part *per se* of this invention, the details of these mechanisms are not herein shown in detail.

As a result of this construction a very rigid support is afforded to the main frame at a height which enables it to be used over rows of corn of considerable height, the traction bearing wheels swinging through a wide angle in supports which are very rigid because of the application of power direct to the rim of the wheel, and in substantial horizontal alinement with the frame instead of at the hub of the traction wheel. Another advantage lies in the clearing action of the barrel pinion the teeth of which not only mesh down well into the spaces between the spud blocks, but tend to force any dirt that may be clinging thereto through the spaces and thereby leave the wheel clear to firmly grip the soil and drive the tractor as desired. The flexibility of the connections between the motor and the barrel pinion allows the frame to weave slightly without affecting the alinement of the parts, as the disposition of the pinion bearings in relation to the main wheel bearings hold the two wheels or the wheel and pinion in fixed alinement regardless of deflection of the frame. The spud blocks may be readily renewed as worn or broken without dismounting the entire wheel.

Obviously, changes may be made in the details of construction without departing from the spirit of my invention and I do not care to limit myself to any particular form or arrangement of parts.

What I claim is:—

1. In a tractor, a traction bearing wheel including rim members, spud blocks secured in spaced relation around the rim members and a pinion having barrel teeth meshing with the spud members for driving the traction wheel.

2. In a traction bearing wheel, rim members, spud blocks having oppositely disposed lugs near the extremities thereof, holding means each engaging a pair of abutting lugs and the rim members and securing the spud blocks in spaced relation and a power driven pinion meshing with the spud blocks for driving the traction wheel.

3. In a tractor, a traction bearing wheel having rim members, spud blocks on the members having oppositely disposed pairs of lugs near the extremities thereof conforming to the rim members and abutting the companion lugs, holding members passing through registering recesses in the abutting faces of the lugs and through the flanges of the rim members, and a sprocket wheel meshing with the spud blocks for operating the tractor wheel.

4. In a tractor, a traction bearing wheel having rim members, spud blocks on the members having oppositely disposed pairs of lugs near the extremities thereof conforming to the rim members and abutting the companion lugs, holding members passing through registering recesses in the abutting faces of the lugs and through the flanges of the rim members, a power driven pinion, and barrel teeth journaled on the periphery thereof for meshing with the spud blocks and driving the traction wheel.

5. In a tractor, a main frame, an upright spindle journaled between oppositely disposed bearings near the extremities of the frame, a traction bearing wheel journaled on the spindle, a power driven pinion journaled on the spindle in mesh with the traction tread of the wheel, and means for imparting power to the pinion having universal joint connection coincident with the axis of movement of the spindle.

6. In a tractor, a main frame, bearing brackets oppositely disposed near the extremities thereof, lower bearing members secured to the frame in vertical alinement with the upper bearing brackets, spindles journaled between each bracket and bearing member and provided with a traction bearing stud, a stud yoke on the upper portion of the spindle, a pinion stud extending inwardly thereon in parallel relation with the wheel stud, a traction bearing wheel journaled on the wheel stud, a pinion journaled on the yoke stud meshing with the tread surface of the traction bearing wheel, and a power driven shaft extending loosely through an opening in the upper part of the spindle, in operative connection with the pinion, the shaft having universal joint connections coincident with the axis of movement of the spindle.

7. In a tractor, a main frame, bearing brackets oppositely disposed near the extremities thereof, lower bearing members secured by the frame in vertical alinement with the upper bearing members, spindles journaled between each bracket and bearing member and each provided with a traction bearing stud, a stud yoke on the upper portion of the spindle, a pinion stud extending inwardly thereon in parallel relation with the wheel stud, a traction bearing wheel journaled on the wheel stud, a pinion journaled on the yoke stud meshing with the tread surface of the traction bearing wheel, a power driven shaft extending loosely through an opening in the upper part of the spindle in operative connection with the pinion, the shaft having universal joint connections coincident with the axis of movement of the spindle, and means on the frame for swinging all the spindles in unison.

8. In a tractor, a main frame, oppositely disposed brackets near the extremities thereof in substantially the plane of the frame, bearing members secured by braces to the frame each in vertical alinement below a bracket, spindles each journaled in a bearing member at its lower end and stepped against the under bearing face of the companion upper bracket, a bearing stud extending laterally from the lower portion of the spindle, an annulus forming the upper part of the spindle, a yoke having support on the annulus with a bearing stud thereon in parallel relation with the spindle stud, a traction bearing wheel journaled on the bearing stud of each spindle, a pinion journaled on the bearing stud of each yoke in mesh with the traction tread surface of the traction bearing wheel, and power shafts each extending through the annulus of a spindle to drive a pinion, each shaft having universal joints coincident with the axis of movement of the bearing wheel spindle.

9. In a tractor, a main frame, bearing brackets extending laterally therefrom, lower bearing members each alined vertically with an upper bracket, brace members depending from the frame and supporting the bearing members, spindles each having a journal rotatable in a bearing and an upper thrust bearing on the spindle detachably mounted in the bracket, an annulus formed on the upper portion of the spindle, a yoke secured to the annulus with a pinion bearing stud extending inwardly on the yoke in substantial alinement axially with the spindle yoke, a traction bearing wheel journaled on a stud bearing wheel spindle, traction studs detachably secured on the wheel for forming the tread surface thereof, a pinion journaled on the yoke stud in mesh with the spuds of the traction wheels, a shaft extending through each spindle yoke into operative connection with the companion pinion, and a gimbal ring in the shaft coincident with the axis of oscillation of the bearing wheel spindle.

10. In a tractor, a main frame, bearing brackets, bearing members in vertical alinement below the brackets, obliquely disposed braces supporting the bearing members from the frame, bearing spindles journaled at the lower ends in the bearings and stepped against the underfaces of the brackets near the upper ends, a yoke forming the upper portion of the bearing wheel spindle, a traction bearing wheel shaft extending laterally from the lower portion of the spindle, a bearing yoke secured to the spindle yoke and provided with a pinion stud, a traction bearing wheel journaled on the bearing wheel stud, spud blocks forming the tread face of the traction bearing wheel, a bearing pinion on the yoke stud in mesh with the spud blocks of the traction bearing wheel, shafts each in axial alinement with the pinions, operatively secured thereto at the outer end, and a gimbal ring connection in each shaft having its axis of oscillation coincident with the axis of oscillation of the bearing wheel spindle.

11. In a tractor, a main frame, a bearing wheel spindle in upright position near each corner of the frame, a traction bearing wheel journaled on each spindle, a pinion rotatably mounted on each spindle in mesh with the spudded face of the wheel, a power plant on the main frame, differentially connected shafts operated by the power plant and each connected at the outer end to a pinion, and gimbal ring connections in the shafts forming universal joints coincident with the axes of oscillation of the bearing wheel spindles.

In testimony whereof I affix my signature in presence of two witnesses.

JOHN W. ROMINE.

Witnesses:
G. E. McGrann,
Otto F. Barthel.